United States Patent [19]

Ikeuchi et al.

[11] Patent Number: 4,935,622

[45] Date of Patent: Jun. 19, 1990

[54] ANGLE MEASURING DEVICE USING CLAMPING MEANS

[75] Inventors: Masayuki Ikeuchi; Toshiaki Hata, both of Himeji, Japan

[73] Assignee: Mitsubishi Denki Kabushiki Kaisha, Tokyo, Japan

[21] Appl. No.: 413,645

[22] Filed: Sep. 28, 1989

[51] Int. Cl.⁵ .............................................. B01D 5/34
[52] U.S. Cl. ............................ 250/231.13; 250/237 G
[58] Field of Search ...................... 250/231 SE, 237 G; 341/3, 13

[56] References Cited

U.S. PATENT DOCUMENTS

| | | | |
|---|---|---|---|
| 3,836,260 | 9/1974 | Ulyanov et al. | 250/231 SE |
| 3,944,813 | 3/1976 | Fowler | 250/231 SE |
| 4,418,288 | 11/1983 | Imai et al. | 250/231 SE |
| 4,636,630 | 1/1987 | Nagai | 250/237 G |
| 4,733,070 | 3/1988 | Ookawa et al. | 250/237 G |
| 4,827,122 | 5/1989 | Ikeda | 250/237 G |

FOREIGN PATENT DOCUMENTS 219830 9/1986 Japan .

Primary Examiner—David C. Nelms
Assistant Examiner—Stephone B. Allen
Attorney, Agent, or Firm—Sughrue, Mion, Zinn, Macpeak and Seas

[57] ABSTRACT

An angle measuring device for measuring the turning angle of a crankshaft in an internal combustion engine in order to control the ignition timing, etc. thereof comprises: a rotating disc adapted to rotate in synchronization with the rotation of a crankshaft and having a plurality of slits formed along the circumference thereof; light-emitting elements arranged in the vicinity of the rotating disc; a photodiode adapted to receive light emitted from the light-emitting elements through the slits of the rotating disc; a resistor for converting electric-current signals output from the photodiode into voltage signals; a clamping device for clamping the maximum voltage at the output terminal of the converter to such a voltage value as will not allow the photodiode to be forward-biased, and a signal processing circuit adapted to measure the turning angle of the rotating disc by processing the electric-current signals converted into voltage signal by the resistor.

5 Claims, 3 Drawing Sheets

ANGLE MEASURING DEVICE USING CLAMPING MEANS

BACKGROUND OF THE INVENTION

1. Field of the Invention

This invention relates to an angle measuring device, and in particular, to an angle measuring device for measuring the turning angle of a crankshaft in an internal combustion engine in order to control the ignition timing, etc. thereof.

2. Description of the Related Art

In order to control the ignition timing, etc. of an internal combustion engine, an angle measuring device is used which is adapted to emit a predetermined pulse in synchronization with rotations of the crankshaft of the engine. FIG. 1 shows an example of conventional devices of this type. The device shown comprises a shaft 1 which rotates in synchronization with the rotation of the crankshaft (not shown), a rotating disc 2 attached to the shaft 1, light-emitting elements 3 and 4, light-receiving elements 5 and 6, and an electronic circuit 7 including a semiconductor signal-processing circuit.

FIG. 2 is a plan view of the rotating disc 2 of FIG. 1. As shown in the drawing, a plurality of slits 8a and 8b are provided at predetermined intervals along the circumference of the rotating disc 2, respectively.

FIG. 3 is a circuit diagram schematically showing the signal processing section of the electronic circuit 7 of FIG. 1. The signal processing section shown includes a photodiode 9 one end of which is connected to a power-source line Vcc; this photodiode constitutes the light-receiving element 5 or 6 of FIG. 1. The reference numeral 10 indicates an equivalent capacitor between the anode and cathode of the photodiode 9; 11 indicates a resistor one end of which is connected to the anode of the photodiode 9 and the other end of which is grounded; and 12 indicates a signal processing circuit connected to a connection point A between the photodiode 9 and the resistor 11.

FIG. 4 is a chart showing the quantity of light and the voltage waveform at the connection point A when the photodiode 9 of FIG. 3 receives light emitted from the light-emitting elements 3 and 4.

In this conventional angle measuring device, which has the above-described construction, the rotating disc 2 shown in FIG. 2 rotates by being driven by the shaft 1, in synchronization with the rotation of the associated crankshaft. Light is input to the light-receiving elements 5, 6 and causes them to emit signals only when slits 8a and 8b are positioned between them and the light-emitting elements 3, 4. These signals are processed in the signal processing circuit shown in FIG. 3. Referring to FIG. 3, an output current in accordance with the incident quantity of light flows through the photodiode 9. When the incident quantity of light increases, this output current is augmented, so that the photodiode 9 is forward-biased by the voltage generated in the resistor 11. As a result of this forward-biasing, the capacitor 10 is charged with the time constant determined by the resistor 11 and this equivalent capacitor 10. When the incident quantity of light decreases, the capacitor 10 discharges with the above-mentioned time constant, so that the voltage at the connection point A becomes OFF at an instant t2 which is delayed by D with respect to the instant t1 at which the incident light becomes OFF, as shown by the pulse waveform indicated by the dashed line of FIG. 4.

As a result of this delay D, the accuracy of the signals processed in the signal processing circuit 12 deteriorates, which causes the accuracy of the turning angle of the crankshaft measured by the signal processing circuit 12 to deteriorate.

SUMMARY OF THE INVENTION

This invention has been contrived with a view to eliminating this problem. It is accordingly an object of this invention to provide an angle measuring device which is capable of performing angle measurement with high accuracy.

In accordance with this invention, there is provided an angle measuring device comprising: a rotating disc adapted to rotate in synchronization with the rotation of a crankshaft and having a plurality of slits formed along the circumference thereof; a light-emitting means arranged in the vicinity of the above-mentioned rotating disc; a light-receiving means adapted to receive light emitted from the above-mentioned light-emitting means through the slits of the above-mentioned rotating disc; a conversion means for converting electric-current signals output from said light-receiving means into voltage signals; a clamping means for clamping the maximum voltage at the output terminal of the above-mentioned conversion means to such a voltage value as will not allow the above-mentioned light-receiving means to be forward-biased, and a signal processing circuit adapted to measure the turning angle of the above-mentioned rotating disc by processing the electric-current signals converted into voltage signal by means of the above-mentioned conversion means.

DESCRIPTION OF THE PREFERRED EMBODIMENTS

An embodiment of this invention will now be described with reference to the accompanying drawings.

Figure 1:
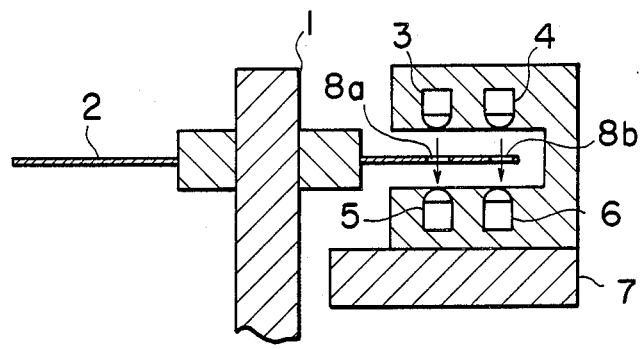
FIG. 1 is a schematic view of a conventional angle measuring device.
Figure 2:
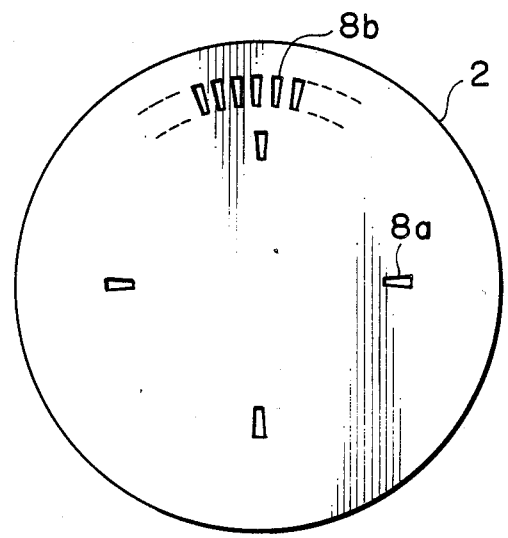
FIG. 2 is a plan view of the rotating disc used in the device of FIG. 1.
Figure 3:
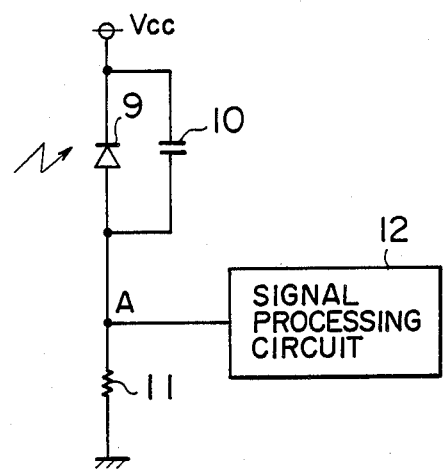
FIG. 3 is a circuit diagram of the signal processing section used in the device of FIG. 1.
Figure 4:
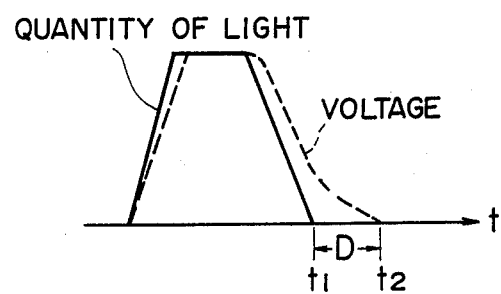
FIG. 4 is an operation-waveform chart of the signal processing section used in the embodiment of FIG. 3.
Figure 5:
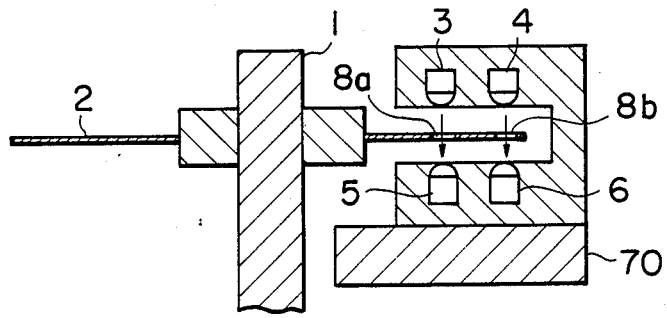
FIG. 5 is a schematic view of an angle measuring device in accordance with an embodiment of this invention.

Referring to FIG. 5, the embodiment shown includes a shaft 1 which rotates in synchronization with the crankshaft (not shown) of an internal combustion engine. Attached to this shaft 1 is a rotating disc 2 which, as shown in FIG. 2, has a plurality of slits 8a and 8b that are arranged at predetermined intervals along the circumference thereof, respectively. Light-emitting elements 3, 4 and light-receiving elements 5, 6 are arranged in such a manner that this rotating disc 2 is positioned between them, an electronic circuit 70 being electrically connected to these elements 3 to 6.

During operation, voltage is applied to the light-emitting elements 3 and 4 by the electronic circuit 70 so as to cause light to be emitted from these light-emitting elements 3 and 4, and the rotating disc 2 is rotated by the shaft 1 in synchronization with the crankshaft (not shown). Only when the slits 8a and 8b come, as a result of the rotation of the rotating disc 2, between the light-emitting and light-receiving elements 3 and 5, and, 4 and 6, respectively, the light emitted from the light-emitting elements 3 and 4 is input through the slits 8a and 8b to the light-receiving elements 5 and 6, thereby causing the light-receiving elements 5 and 6 to output electrical signals to the electronic circuit 70.

Figure 6:
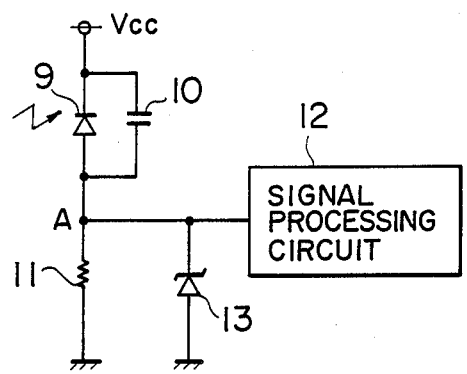
FIG. 6 is a circuit diagram of the signal processing section used in the embodiment of FIG. 5.

A signal processing section as shown in FIG. 6 is formed in the electronic circuit 70. This signal processing section includes a photodiode 9 constituting the light-receiving element 5 or 6. The cathode of this photodiode 9 is connected to a power-source line Vcc, and the anode thereof is grounded through the resistor 11. Connected to a connection point A between the anode of the photodiode 9 and the resistor 11 are a signal processing circuit 12 as well as the cathode of a Zener diode 13. The anode of this Zener diode 13 is grounded. The Zener diode 13 serves to clamp the maximum voltage at the connection point A to such a voltage value as will not allow the photodiode 9 to be forward-biased. The reference numeral 10 indicates an equivalent capacitor connected between the anode and cathode of the photodiode 9.

When the light from the light-emitting element 3 or 4 enters the photodiode 9, an electric current begins to be output from this photodiode 9. When the incident quantity of light to the photodiode 9 increases, the value of the output electric current from the photodiode 9 increases. In accordance with this output current, the voltage at the connection point A between the photodiode 9 and the resistor 11 increases. However, when the voltage at the connection point A attains a certain value which is set by the Zener diode 13, the electric current flows from the connection point A through the Zener diode 13 to the ground, so that the voltage at the connection point A does not rise any further and is clamped. Accordingly, the photodiode 9 is not forward-biased by the voltage at the connection point A, and the equivalent capacitor 10 is not charged. As a result, there is caused no delay between the light input to the signal processing circuit 12 and the voltage waveform at the connection point A.

Thus, the turning angle of the rotating disc 2 is measured by the signal processing circuit 12 to which the voltage at the connection point A is input.

Figure 7:
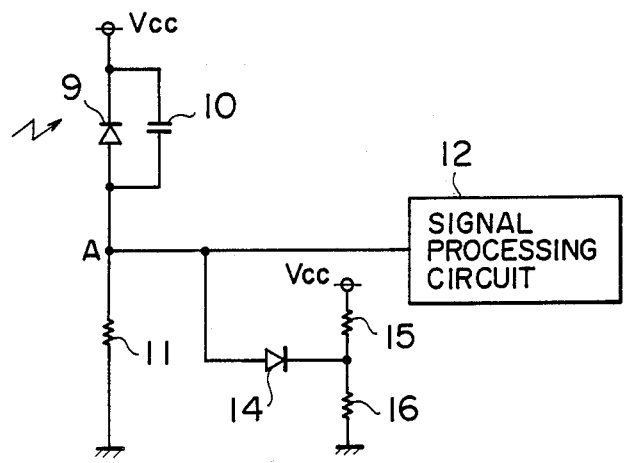
FIG. 7 is a circuit diagram of the signal processing section used in another embodiment of this invention.

The means for clamping the maximum voltage at the connection point A is not limited to the Zener diode 13. It may be composed of, for example, a diode 14 and resistors 15, 16, as shown in FIG. 7. Referring to FIG. 7, the anode of the diode 14 is connected to the connection point A, and the cathode thereof is connected to a power-source line Vcc and the ground through the resistors 15 and 16, respectively. Here, the maximum voltage at the connection point A is clamped to a voltage value which is determined by the two resistors 15 and 16, thus making it possible to perform angle measurement with high accuracy, like the embodiment shown in FIG. 6.

What is claimed is:

1. An angle measuring device comprising:
   a rotating disc adapted to rotate in synchronization with the rotation of a crankshaft and having a plurality of slits formed along the circumference thereof;
   a light-emitting means arranged in the vicinity of said rotating disc;
   a light-receiving means adapted to receive light emitted from said light-emitting means through the slits of said rotating disc;
   a conversion means for converting electric-current signals output from said light-receiving means into voltage signals;
   a clamping means for clamping the maximum voltage at the output terminal of said conversion means to such a voltage value as will not allow said light-receiving means to be forward-biased; and
   a signal processing circuit adapted to measure the turning angle of said rotating disc by processing the electric-current signals converted into voltage signal by means of said conversion means.

2. A device as claimed in claim 1, wherein said light-receiving means comprises a photodiode.

3. A device as claimed in claim 2, wherein said conversion means comprises a first resistor connected between said photodiode and the ground.

4. A device as claimed in claim 3, wherein said clamping means comprises a Zener diode whose cathode is connected to a connection point between said photodiode and said first resistor and whose anode is grounded.

5. A device as claimed in claim 3, wherein said clamping means comprises a diode whose anode is connected to a connection point between said photodiode and said first resistor, a second resistor which is connected between the cathode of said diode and the power-source line, and a third resistor which is connected between the cathode of said diode and the ground.

* * * * *